(12) United States Patent
Lazaro et al.

(10) Patent No.: US 10,651,736 B1
(45) Date of Patent: May 12, 2020

(54) MULTI-LEVEL CONVERTER WITH CONTINUOUS CONDUCTION MODE (CCM) AND DISCONTINUOUS CONDUCTION MODE (DCM)

(71) Applicant: TEXAS INSTRUMENTS INCORPORATED, Dallas, TX (US)

(72) Inventors: Orlando Lazaro, Dallas, TX (US); Alvaro Aguilar, Irving, TX (US); Jeffrey Morroni, Parker, TX (US); Kevin Scoones, San Jose, CA (US); Reza Sharifi, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/233,189

(22) Filed: Dec. 27, 2018

(51) Int. Cl.
*H02M 3/158* (2006.01)
*H02M 1/08* (2006.01)
*H02M 1/00* (2006.01)

(52) U.S. Cl.
CPC .............. *H02M 3/158* (2013.01); *H02M 1/08* (2013.01); *H02M 2001/0009* (2013.01)

(58) Field of Classification Search
CPC . H02M 2001/0012; H02M 2001/0009; H02M 2003/1566; H02M 2003/1557; H02M 3/156; H02M 3/158; H02M 3/1588; H02M 3/155; H02M 3/1582; H02M 3/157; H02M 3/1563
See application file for complete search history.

(56) References Cited

U.S. PATENT DOCUMENTS

| | | |
|---|---|---|
| 10,075,080 B1 | 9/2018 | Scoones et al. |
| 2017/0250607 A1* | 8/2017 | Zhak ................. H02M 1/36 |

* cited by examiner

*Primary Examiner* — Bryan R Perez
(74) *Attorney, Agent, or Firm* — Michael A. Davis, Jr.; Charles A. Brill; Frank D. Cimino (57) ABSTRACT

A power converter device includes a set of switches configured to switch between at least three input-side voltage levels to provide output pulses. The power converter device also includes a control circuit for the set of switches, wherein the control circuit configured to selectively switch the power converter device between a continuous conduction mode of operation (CCM) having a first charge per pulse and a discontinuous conduction mode of operation (DCM) having a second charge per pulse, the second charge per pulse being greater than the first charge per pulse.

18 Claims, 11 Drawing Sheets

MULTI-LEVEL CONVERTER WITH CONTINUOUS CONDUCTION MODE (CCM) AND DISCONTINUOUS CONDUCTION MODE (DCM)

BACKGROUND

Power supplies and power converters are used in a variety of electronic systems. Electrical power is generally transmitted over long distances as an alternating current (AC) signal. The AC signal is divided and metered as desired for each business or home location, and is often converted to direct current (DC) for use with individual electronic devices or components. Modern electronic systems often employ devices or components designed to operate using different DC voltages. Accordingly, different DC-DC converters, or a DC-DC converter that supports a wide range of output voltages, are needed for such systems.

There are many different DC-DC converter topologies. The available topologies differ with regard to the components used, the amount of power handled, the input voltage(s), the output voltage(s), efficiency, reliability, size and/or other characteristics. Some ongoing innovation efforts for DC-DC converters involve improving efficiency (reducing losses). Two example sources of losses in DC-DC converters are switching losses and conduction losses. An ideal efficiency control scheme would be able to monitor the load current and instantaneously adjust switching parameters and/or the amount of current conveyed per switch cycle. This ideal efficiency control scheme is not possible due to detection/response delays and/or other imperfections. Also, DC-DC converter topology differences result in incompatibilities when applying the efficiency control scheme for one DC-DC converter topology to another DC-DC converter topology. For example; efficiency control schemes for two-level converter topologies are not adequate for multi-level (3 or more) converter topologies.

SUMMARY

In accordance with at least one example, a power converter device comprises a set of switches configured to switch between at least three input-side voltage levels to provide output pulses. The power converter device also comprises a control circuit for the set of switches, wherein the control circuit configured to selectively switch the power converter device between a continuous conduction mode of operation (CCM) having a first charge per pulse and a discontinuous conduction mode of operation (DCM) having a second charge per pulse, the second charge per pulse being greater than the first charge per pulse In accordance with at least one example, a power converter device comprises a set of switches with a plurality of transistors, wherein the set of switches is configured to provide charge to an output node based on at least three input-side voltage levels. The power converter device also comprises a controller configured to selectively control the set of switches in the CCM and the DCM, and wherein the DCM operations provide more charge per pulse than the CCM operations.

In accordance with at least one example, a power conversion method comprises operating a converter with at least three input-side voltage levels to provide charge to an output node in the CCM. The power conversion method also comprises detecting a mode switch trigger. In response to the detected mode switch trigger, the power conversion method also comprises transitioning operations of the converter from the CCM to the DCM, wherein the DCM operations provide more charge per pulse than the CCM operations

BRIEF DESCRIPTION OF THE DRAWINGS

For a detailed description of various examples, reference will now be made to the accompanying drawings in which:

FIGS. 7A-1 and 7A-2 (collectively referred to hereafter as FIG. 7A), and FIGS. 7B-1 and 7B-2 (collectively referred to hereafter as FIG. 7B) show the power converter of FIG. 6 and tertiary-pulse DCM operations in accordance with various examples;

DETAILED DESCRIPTION

Disclosed herein are power converter systems and methods with multiple modes of operation, including a continuous conduction mode (CCM) and a discontinuous conduction mode (DCM), where the power converter is configured to switch between at least three input-side voltage levels to provide output pulses. In at least some examples, a power converter provides more charge per pulse with the DCM operations than with the CCM operations. An example power converter device comprises a switch arrangement (a set of switches) configured to switch between at least three input-side voltage levels to provide output pulses. To control the set of switches, a control circuit (controller) is provided, where the control circuit is configured to selectively control the set of switches in the CCM or the DCM. In at least some examples, the control circuit monitors switch mode triggers to determine when to transition from the CCM to the DCM or vice versa. An example trigger to transition from the CCM to the DCM comprises an output node current falling below a current threshold. Another example trigger to transition from the DCM to the CCM comprises output pulses having a separation that is less than a separation threshold.

An example converter is a three-level converter (i.e., up to three voltage levels are used to provide output pulses). In the CCM for a three-level converter, two of the three voltage levels are used to provide output pulses (e.g., V_IN and V_IN/2, or V_IN/2 and ground). In the DCM for a three-level converter, there are two options. In a first option, three voltage levels are used to provide output pulses in the DCM (e.g., V_IN, V_IN/2, and ground). In a second option, only two voltage levels are used to provide output pulses in the DCM (e.g., V_IN and ground). In some examples, the control circuit uses pulse width modulation (PWM) in the CCM, and uses pulse frequency modulation (PFM) in the DCM.

In some examples, the set of switches and control circuit are components of an integrated circuit (e.g., a packaged or unpackaged die) and/or other products provided to power converter designers. To complete a power converter, a designer combines the set of switches and the control circuit described herein with other components on a printed circuit board (PCB) or other connection interface. Examples of other components used for a power converter include an input capacitor, an auxiliary capacitor, an output inductor, and an output capacitor. To provide a better understanding, various power converter options, mode options, and related components are described using the figures as follows.

Figure 1:
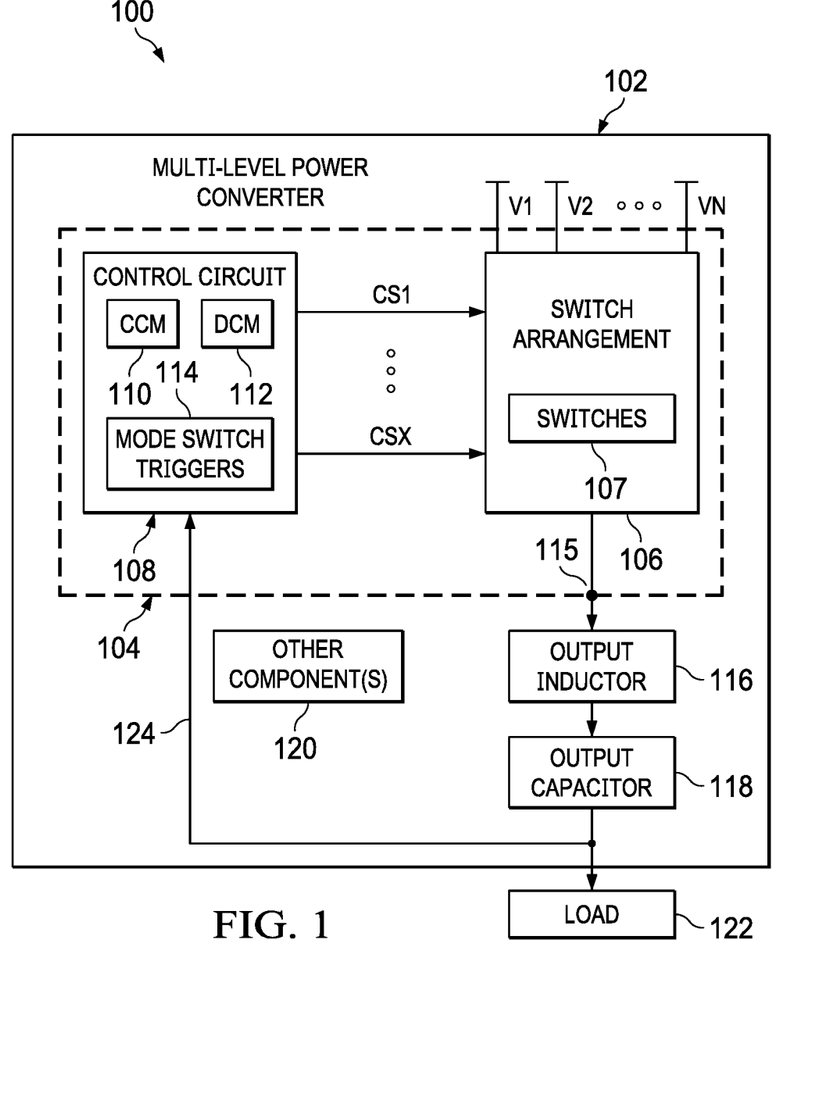
FIG. 1 shows a block diagram of an electrical system 100 in accordance with various examples.

FIG. 1 shows a block diagram of an electrical system 100 in accordance with various examples. As shown, the electrical system 100 comprises a multi-level power converter 102 coupled to a load 122. In operation, the multi-level power converter 102 supplies a variable amount of power to the load 122 using a device 104 that includes a switch arrangement (a set of switches) 106 and a control circuit 108 to control the switch arrangement 106. In one example, the device 104 represents a single integrated circuit. In another example, the device 104 represent multiple integrated circuits that are coupled together to form a circuit (e.g., a multi-die module). Regardless of the particular configuration and components used for the device 104, the control circuit 108 supports the CCM using CCM logic 110, and supports the DCM using DCM logic 112. To switch between the CCM and the DCM (CCM to DCM, or DCM to CCM), the control circuit 108 also includes mode switch triggers 114. An example trigger to transition from the CCM to the DCM comprises an output node current falling below a current threshold. It should be noted that in some examples, the control circuit 108 is configured to control the switch arrangement 106 in the DCM to provide output pulses with a peak value that is at least two times larger than the current threshold. Another example trigger to transition from the DCM to the CCM comprises output pulses having a separation that is less than a separation threshold (e.g., the transition from the DCM to the CCM occurs when output pulses in the DCM are bunched together).

As shown in FIG. 1, the switch arrangement 106 has N input-side voltage levels (labeled V1-VN), where N varies for different examples. In one example N=3. In another example, N=4 or more. To provide output pulses, the control circuit 108 provides control signals (labeled CS1-CSX), where X varies in different examples. The control signals from the control circuit 108 selectively controls switches 107 of the switch arrangement 106 to provide output pulses using the CCM or the DCM based on the available input-side voltage levels. In at least some examples, the switches 107 correspond to transistors, and the control signals from the control circuit 108 correspond to gate drive signals.

In some examples, the control circuit 108 controls the switch arrangement 106 such that all of the input-side voltage levels (V1-VN) are used to provide output pulses in the DCM. In other examples, the control circuit 108 controls the switch arrangement 106 such that less than all of the input-side voltage levels (V1-VN) are used to provide output pulses in the DCM. Also, in some examples, the control circuit 108 uses PWM to control the switch arrangement 106 in the CCM, and PFM to control the switch arrangement 106 in the DCM.

In the example of FIG. 1, output pulses from the switch arrangement 106 are provided to an output node 115 of the device 104. In different examples, the output node 115 corresponds to an integrated circuit pad, a package pin, or a printed circuit board (PCB) pad or contact. In the example of FIG. 1, the output node 115 is coupled to an output inductor 116, the output inductor 116 is coupled to an output capacitor 118, and the output capacitor 118 is coupled to the load 122. In some examples, the multi-level power converter 102 includes other component(s) 120 such as an input capacitor.

In the example of FIG. 1, the output inductor 116, the output capacitor 118, and the other component(s) 120 are represented as being separate from the device 104. In other examples, at least one of the output inductor 116, the output capacitor 118, and the other component(s) 120 are included with the device 104. Also, in the example of FIG. 1, a feedback path 124 to the control circuit 108 is represented as coming from a point between the output capacitor 118 and the load 122. The feedback path 124 enables the control circuit to monitor voltage and/or current levels to the load 122. In some examples, the mode switch triggers 114 are based on current sense values from the feedback path 124. Also, in some examples, the feedback path 124 provides values from a different point of the electrical system 100 (e.g., a point between the output inductor 116 and the output capacitor 118, a point between the output node 115 and the output inductor 116, or a point between the switch arrangement 106 and the output node 115). Feedback from one or more of these different points enables the control circuit 108 to analyze output pulses resulting from the operations of the switch arrangement 106 and to switch between the CCM and the DCM as needed.

Figure 2:
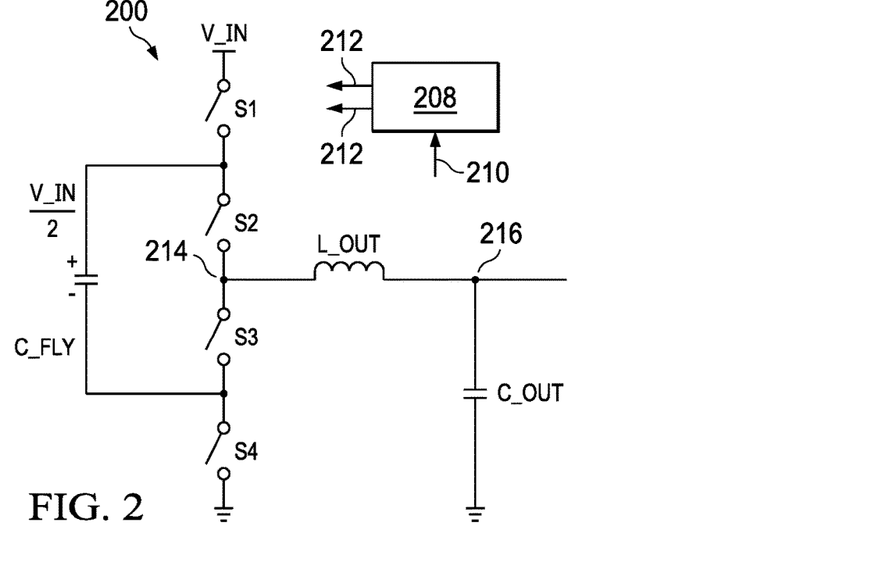
FIG. 2 shows a schematic diagram of a three-level power converter components in accordance with various examples.

FIG. 2 shows a schematic diagram of three-level power converter 200 (an example of the multi-level power converter 102 of FIG. 1) in accordance with various examples. As shown, the three-level power converter 200 includes four switches (S1-S4) coupled in series between an input voltage (V_IN) and ground. The three-level converter 200 also includes a flying capacitor (C_FLY) with a charge +V_IN/2, where C_FLY has its positive electrode coupled between S1 and S2, and it negative electrode coupled between S3 and S4. Also represented in FIG. 2 is a control circuit 208 (an example of the control circuit 108 in FIG. 1) for the three-level power converter 200. In operation, the control circuit 208 provides control signals 212 to control S1-S4 to provide output pulses using the CCM or the DCM to an output node 214 (an example of the output node 115 in FIG. 1) based on V_IN, V_IN/2, and ground. In some examples, control circuit 208 switches between CCM and DCM according to mode switch triggers as described herein.

In some examples, the control circuit 208 uses PWM in the CCM to provide control signals 212. For example, to provide V_IN to the output node 214, the control signals 212 direct S1 and S2 to close (while S3 and S4 are open). To provide V_IN/2 to the output node 214, the control signals 212 either direct S2 and S4 to close (while S1 and S3 are open) or direct S1 and S3 to close (while S2 and S4 are open). To provide ground to the output node 214, the control signals 212 direct S3 and S4 to close (while S1 and S2 are open).

In an example CCM operation, the control signals 212 direct S1-S4 to switch between coupling V_IN and V_IN/2 to the output node 214 at a fixed frequency. In another example CCM operation, the control signals 212 direct S1-S4 to switch between coupling V_IN/2 and ground to the output node 214 at a fixed frequency. As desired, PWM is used to vary the pulse width in the CCM while the frequency stays the same.

In an example DCM operation, the control signals 212 direct S1-S4 to switch between coupling V_IN, V_IN/2, and ground to the output node 214 (see e.g., the pulses of FIGS. 7A and 7B), where the frequency of pulses is adjustable. In another example DCM operation, the control signals 212 direct S1-S4 to switch between coupling V_IN and ground to the output node 214 (see e.g., the pulse of FIG. 6), where the frequency of pulses is adjustable. As desired, PFM is used to adjust the frequency of pulses in the DCM.

Figure 3A:
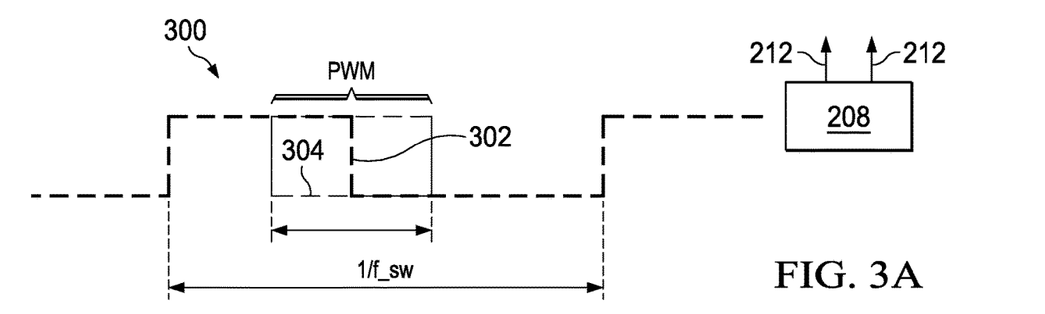
FIG. 3A shows an illustration of pulse width modulation (PWM) operations in accordance with various examples.

FIG. 3A shows an illustration of PWM operations 300 in accordance with various examples. For example, the PWM operations 300 are performed during the CCM of a multi-level power converter (e.g., the multi-level power converter 102 of FIG. 1 or the three-level power converter 200 of FIG. 2). As shown in FIG. 3A, the PWM operations 300 involve adjusting the timing of a pulse's falling edge 302 within an adjustment window 304, while a fixed switching frequency (f_sw) is used. In one example, PWM adjustments are implemented using the control signals 212 from the control circuit 208.

Figure 3B:
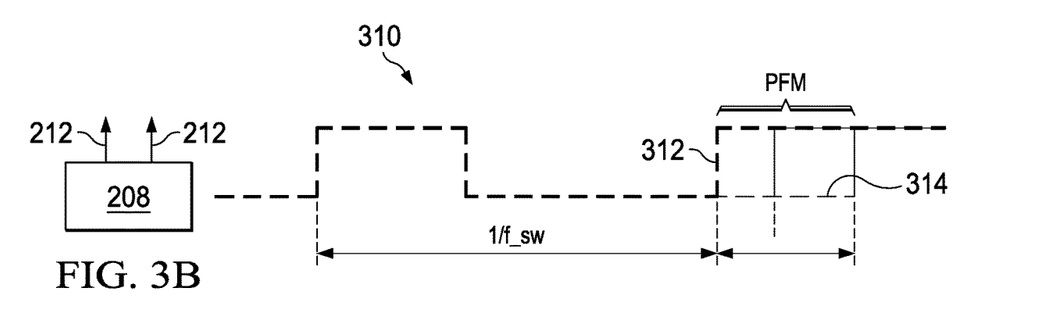
FIG. 3B shows an illustration of pulse frequency modulation (PFM) operations in accordance with various examples.

FIG. 3B shows an illustration of PFM operations 310 in accordance with various examples. For example, the PFM operations 310 are performed during the DCM of a multi-level power converter (e.g., the multi-level power converter 102 of FIG. 1 or the three-level power converter 200 of FIG. 2). As shown in FIG. 3B, the PFM operations 310 involve adjusting the timing of a subsequent rising edge 312 (after a pulse) within an adjustment window 314. In other words, PFM involves adjusting the value of f_sw. In one example, PFM adjustments are implemented using the control signals 212 from the control circuit 208.

Figure 4:
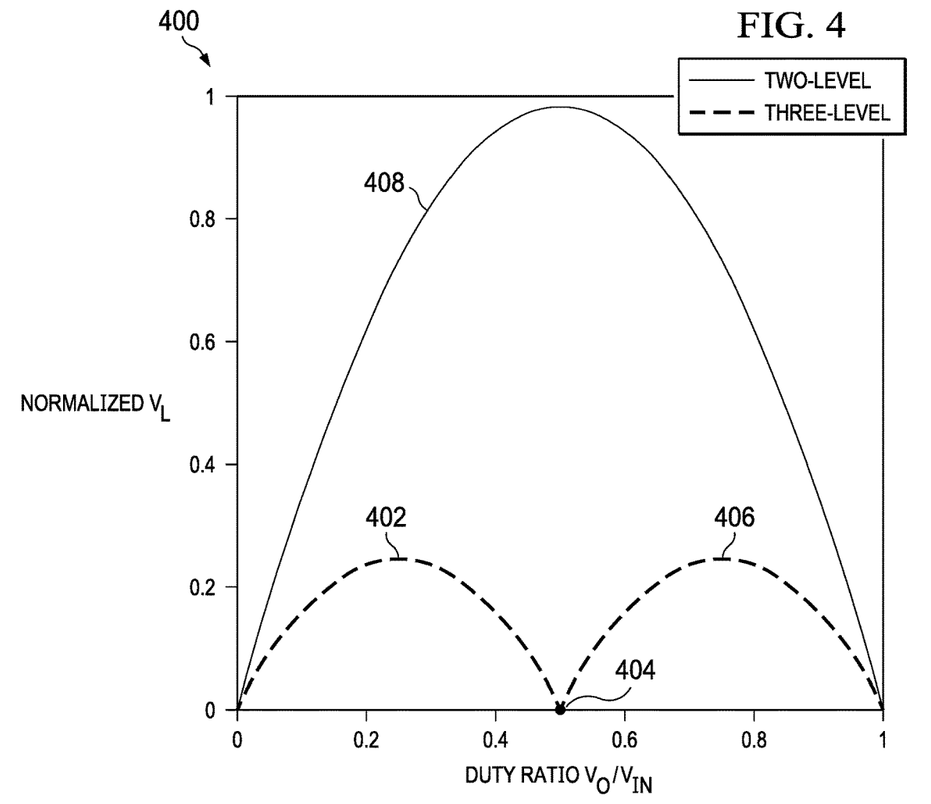
FIG. 4 is a graph illustrating output node current as a function of duty ratio for three-level and two-level power converters.

FIG. 4 is a graph 400 illustrating maximum output node current as a function of duty ratio for three-level and two-level power converters in PWM DCM operation (normalized by f_sw and L_OUT). In graph 400, the two-level curve 408 shows that the output node current for two-level operations (e.g., switching between V_IN and ground) is a maximum at a duty ratio of 50% and is higher than the output node current for three-level operations except near the minimum and maximum duty ratios. The three-level curves 402 and 406 show that the output node current for three-level operations (e.g., switching between V_IN and V_IN/2, or switching between V_IN/2 and ground) is a maximum at a duty ratio of around 25% and 75% and is lower than the output node current for two-level operations except near the minimum and maximum duty ratios for two-level operations. In particular, the null node 404 at the 50% duty ratio for three-level operations indicates that three-level power converters cannot provide sufficient output current at a 50% duty ratio while in PWM DCM. Accordingly, existing DCM techniques developed for two-level power converters are not effective for three-level power converters. For a two-level power converter, an example common practice for light-load operation is to detect PWM DCM operation (or detect negative current on the output node) and generate pulses similar to PWM DCM operation, but space them proportional to the load current. For a three-level converter, when V_IN/2 nears V_OUT not much charge can be delivered with this method.

Figure 5A:
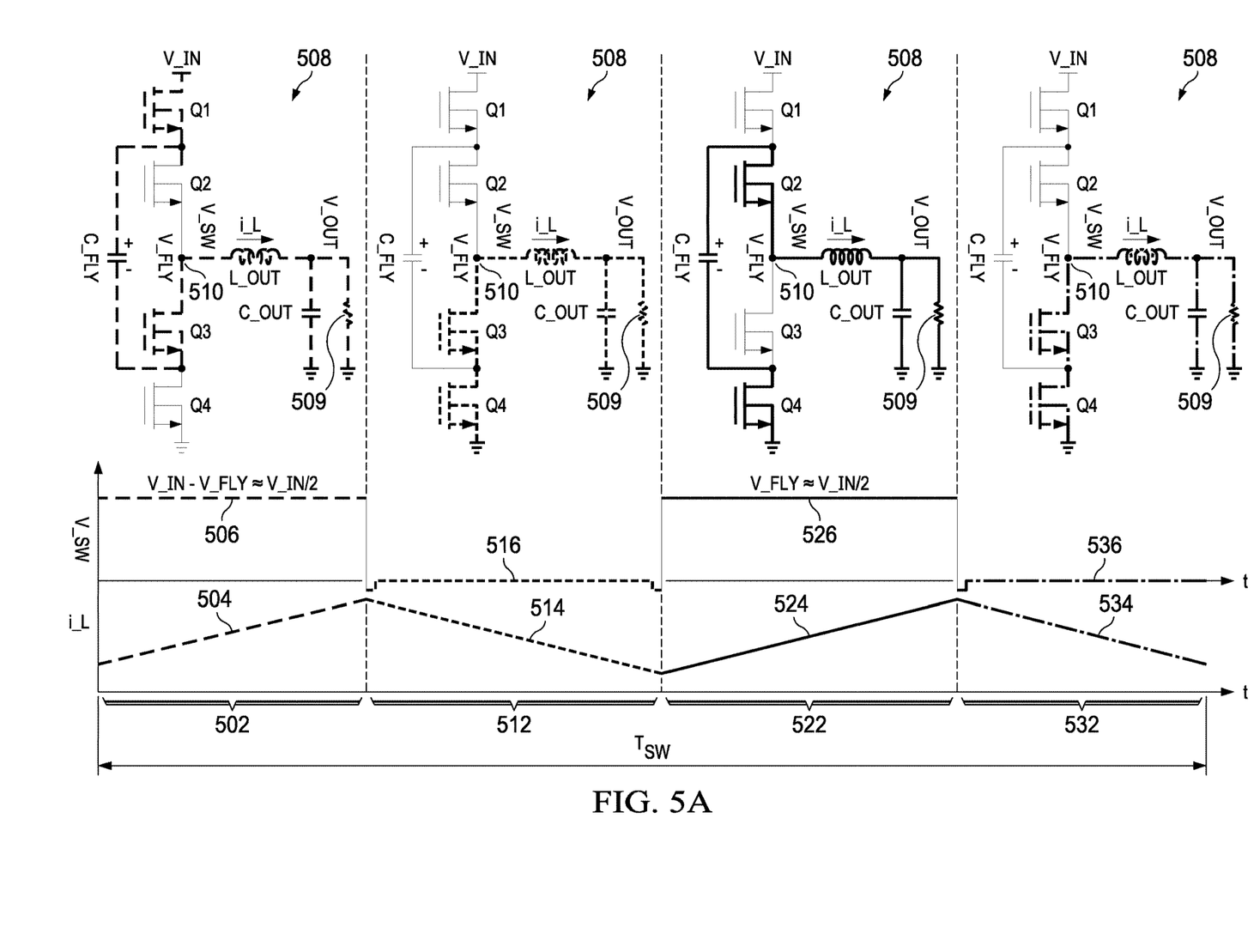
FIGS. 5A and 5B show a power converter and different states of operation during a continuous conduction mode (CCM) in accordance with various examples.
Figure 5B:
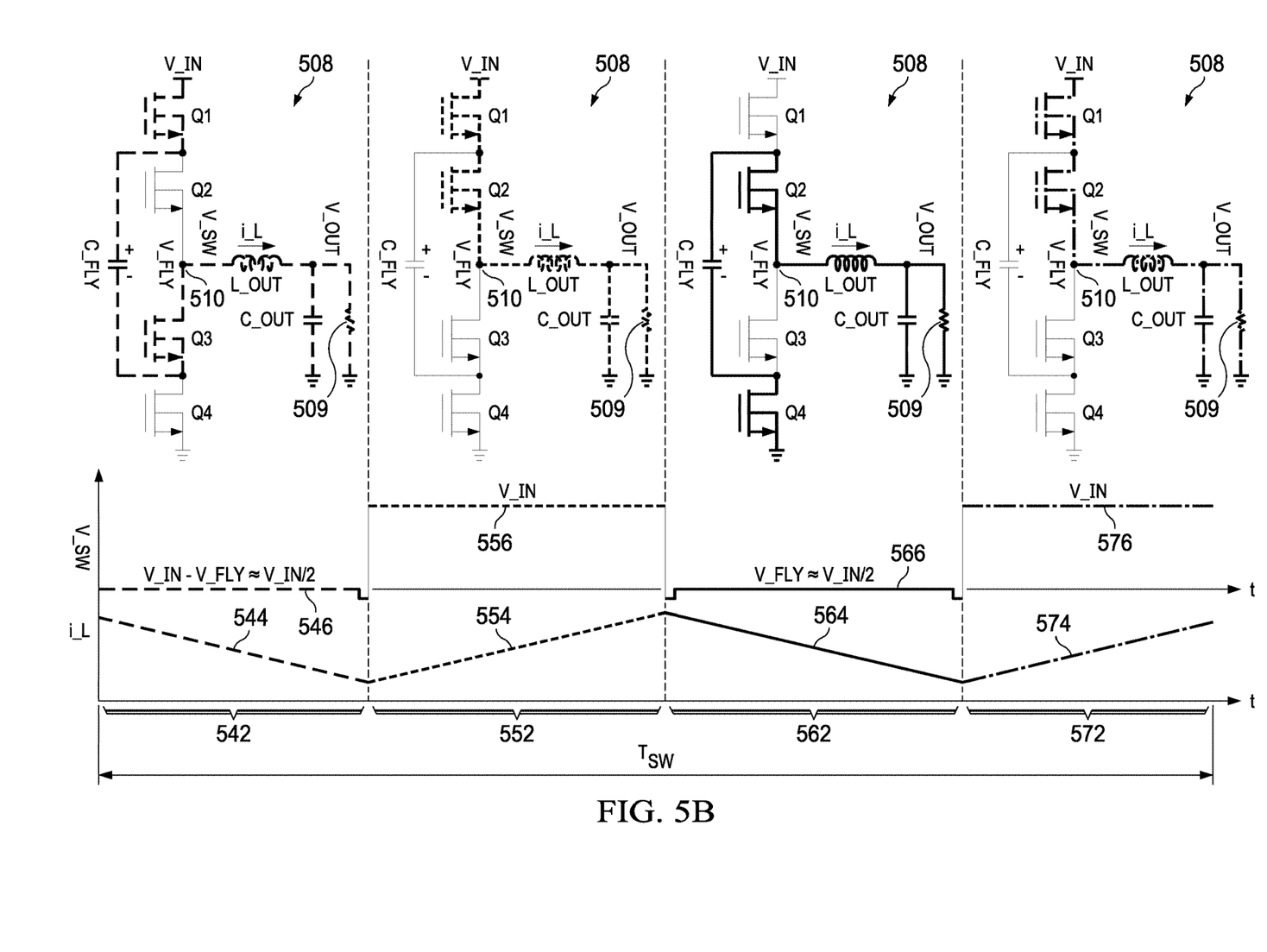

FIGS. 5A and 5B show a multi-level power converter 508 and different states of operation (the states operation are labeled 502, 512, 522, 532, 542, 552, 565, 572 in FIGS. 5A and 5B) during the CCM in accordance with various examples. As shown in FIGS. 5A and 5B, the multi-level power converter circuit 508 is a three-level power converter comparable to the three-level power converter 200 of FIG. 2, where the transistors (Q1-Q4) for the multi-level power converter circuit 508 of FIG. 5 correspond to the switches (S1-S4) the three-level power converter 200 of FIG. 2.

More specifically, each of the transistors has a control terminal (e.g., a gate terminal), a first current terminal (e.g., a source terminal), and a second current terminal (e.g., a drain terminal). For the multi-level power converter 508, the first current terminal of Q1 is coupled to V_IN and the second current terminal of Q1 is coupled to a first current terminal of Q2. Also, a second current terminal of Q2 is coupled to a first current terminal of Q3, a second current terminal of Q3 is coupled to first current terminal of Q4, and the second current terminal of Q4 is coupled to ground. As shown, C_FLY for the multi-level power converter 508 has a positive electrode coupled to the first current terminal of Q1 and to the first current terminal of Q2, and a negative electrode coupled to the second current terminal of Q3 and to the first current terminal of Q4. Also, L_OUT is coupled to an output node 510 (an example of the output node 115 in FIG. 1) between the second current terminal of Q2 and the first current terminal of Q3. The current levels at L_OUT are labeled as i_L. The multi-level power converter 508 also shows C_OUT coupled to L_OUT. A representative load 509 coupled to the C_OUT receives power from the multi-level power converter 508 (e.g., a fixed voltage level and variable current level). The control terminals for the Q1-Q4 couple to respective drive circuits (e.g., components of the control circuit 108 in FIG. 1, or components of the control circuit 208 in FIG. 2).

In FIG. 5A, CCM operations for the multi-level power converter 508 are represented, where the CCM operations involve switching between V_IN/2 and ground as directed by a control circuit (e.g., the control circuit 108 in FIG. 1 or the control circuit 208 in FIG. 2). More specifically, as shown in state 502, Q1 and Q3 of the multi-level power converter circuit 508 are directed to allow current flow, resulting in an output node voltage 506 (labeled V_SW, and related to the switch arrangement represented by Q1-Q4) with a value V_IN−V_FLY, which is approximately V_IN/2, and resulting in increasing output inductor current (i_L) values represented by slope 504. In state 512, Q3 and Q4 are directed to allow current flow, resulting in an output node voltage 516 for V_SW corresponding to ground, and resulting in decreasing i_L values represented by slope 514. In state 522, Q2 and Q4 are directed to allow current flow, resulting in an output node voltage 526 for V_SW corresponding to V_FLY, which is approximately V_IN/2, and resulting in increasing i_L values represented by slope 524. In state 532, Q3 and Q4 are again directed to allow current flow, resulting in an output node voltage 536 for V_SW corresponding to ground, and resulting in decreasing i_L values represented by slope 534.

In FIG. 5B, CCM operations for the multi-level power converter 508 are represented, where the CCM operations involve switching between V_IN/2 and V_IN as directed by a control circuit (e.g., the control circuit 108 in FIG. 1 or the control circuit 208 in FIG. 2). More specifically, as shown in state 542, Q1 and Q3 are directed to allow current flow, resulting in an output node voltage 546 for V_SW with a value V_IN−V_FLY, which is approximately V_IN/2, and resulting in decreasing i_L values represented by slope 544. In state 552, Q1 and Q2 are directed to allow current flow, resulting in an output node voltage 556 for V_SW corresponding to V_IN, and resulting in increasing i_L values represented by slope 554. In state 562, Q2 and Q4 are directed to allow current flow, resulting in an output node voltage 566 for V_SW corresponding to V_FLY, which is approximately V_IN/2, and resulting in decreasing i_L values represented by slope 564. In state 572, Q1 and Q2 are again directed to allow current flow, resulting in an output node voltage 576 for V_SW corresponding to V_IN, and resulting in increasing i_L values represented by slope 574.

Figure 6:
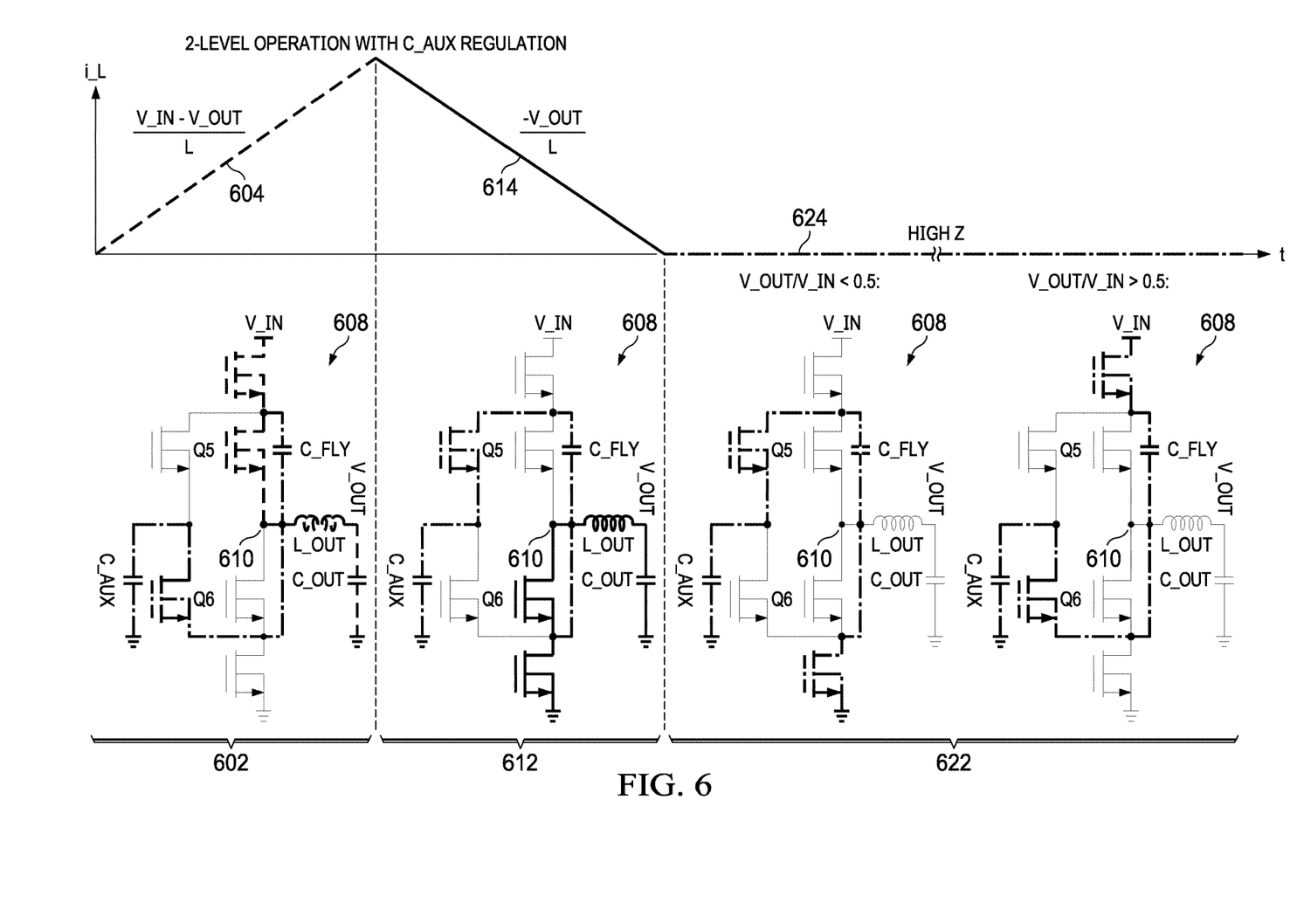
FIG. 6 shows a power converter and two-level discontinuous conduction mode (DCM) operations in accordance with various examples.

FIG. 6 shows a multi-level power converter 608 and two-level DCM operations in accordance with various examples. As shown in FIG. 6, the multi-level power converter 608 is a three-level power converter comparable to the three-level power converter 200 of FIG. 2, and the multi-level power converter 508 of FIGS. 5A and 5B, where Q1-Q4 in FIG. 6 correspond to the switches (S1-S4) the three-level power converter 200 of FIG. 2, and to Q1-Q4 in FIGS. 5A and 5B. Also, the multi-level power converter 608 of FIG. 6 includes an auxiliary capacitor (C_AUX), a fifth transistor (Q5), and a sixth transistor (Q6), where operations of Q5 and Q6 selectively enable charge from C_AUX to pass to other points of the multi-level power converter 608. In some examples, C_AUX, Q5, and Q6 are included with the multi-level power converter 508 of FIGS. 5A and 5B, but are not used during CCM operations.

Each of the transistors Q5 and Q6 has a control terminal (e.g., a gate terminal), a first current terminal (e.g., a source terminal), and a second current terminal (e.g., a drain terminal). As shown in FIG. 6, a first current terminal of Q5 is coupled to the second terminal of Q1 and to the first current terminal of Q2. Meanwhile, a second current terminal of Q5 is coupled to the first current terminal of Q6. The second current terminal of Q6 is coupled to the second current terminal of Q3 and to the first current terminal of Q4. C_AUX includes a positive electrode coupled to the second current terminal of Q5 and to the first current terminal of Q6. The negative electrode of C_AUX is coupled to ground.

In FIG. 6, two-level DCM operations for the multi-level power converter 608 are represented, where the two-level DCM operations involve switching between V_IN and ground as directed by a control circuit (e.g., the control circuit 108 in FIG. 1 or the control circuit 208 in FIG. 2). More specifically, as shown in state 602, Q1, Q2, and Q6 of the multi-level power converter circuit 608 are directed to allow current flow, resulting in the output node 610 having a voltage level of V_IN−V_OUT, and resulting in increasing output inductor current values ((V_IN−V_OUT)/L_OUT)) represented by slope 604. In state 612, Q3, Q4, and Q5 are directed to allow current flow, resulting in the output node 610 having a voltage level of −V_OUT, and resulting in decreasing i_L values (−V_OUT/L_OUT) represented by slope 614. In state 622, two scenarios are represented. For a scenario in which V_OUT/V_IN is less than 0.5, Q4 and Q5 are directed to allow current flow, resulting in high-impedance such that the i_L values are approximately zero as represented by slope 624. For a scenario in which V_OUT/V_IN is greater than 0.5, Q1 and Q6 are directed to allow current flow, resulting in high-impedance such that i_L values are approximately zero as represented by slope 624.

Figure 7A:
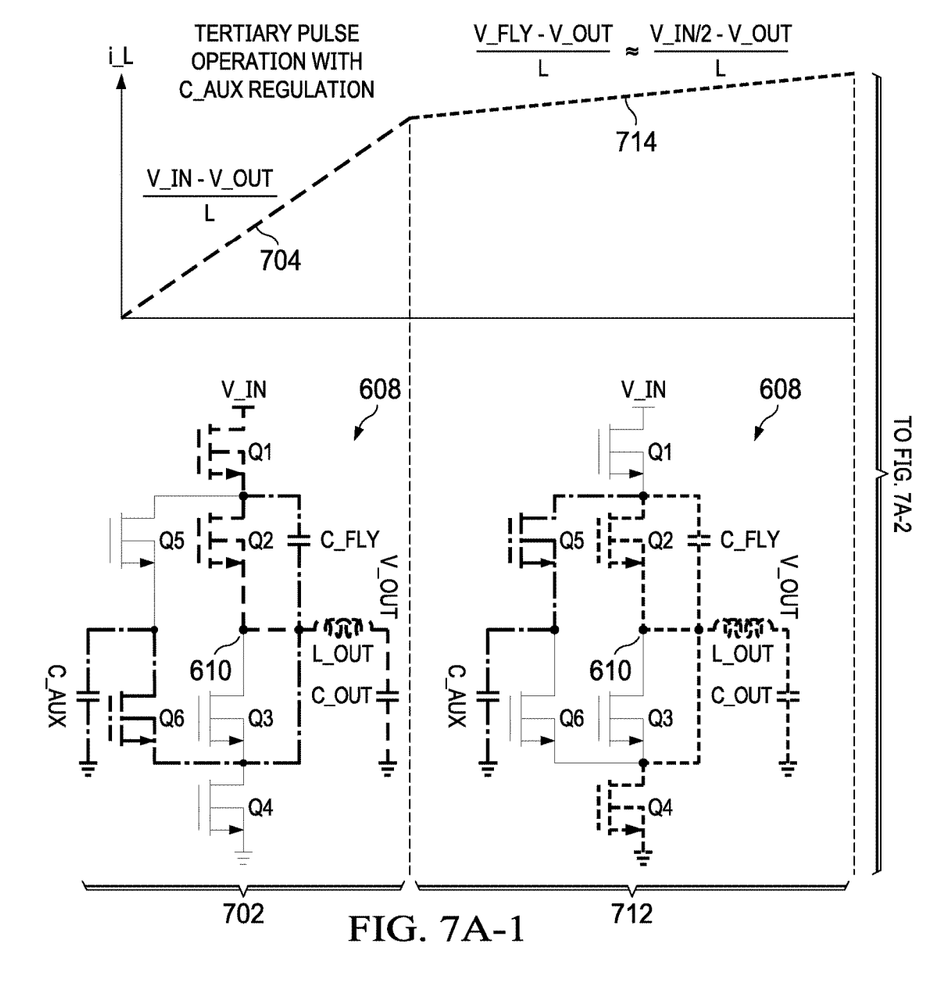
Figure 7A:
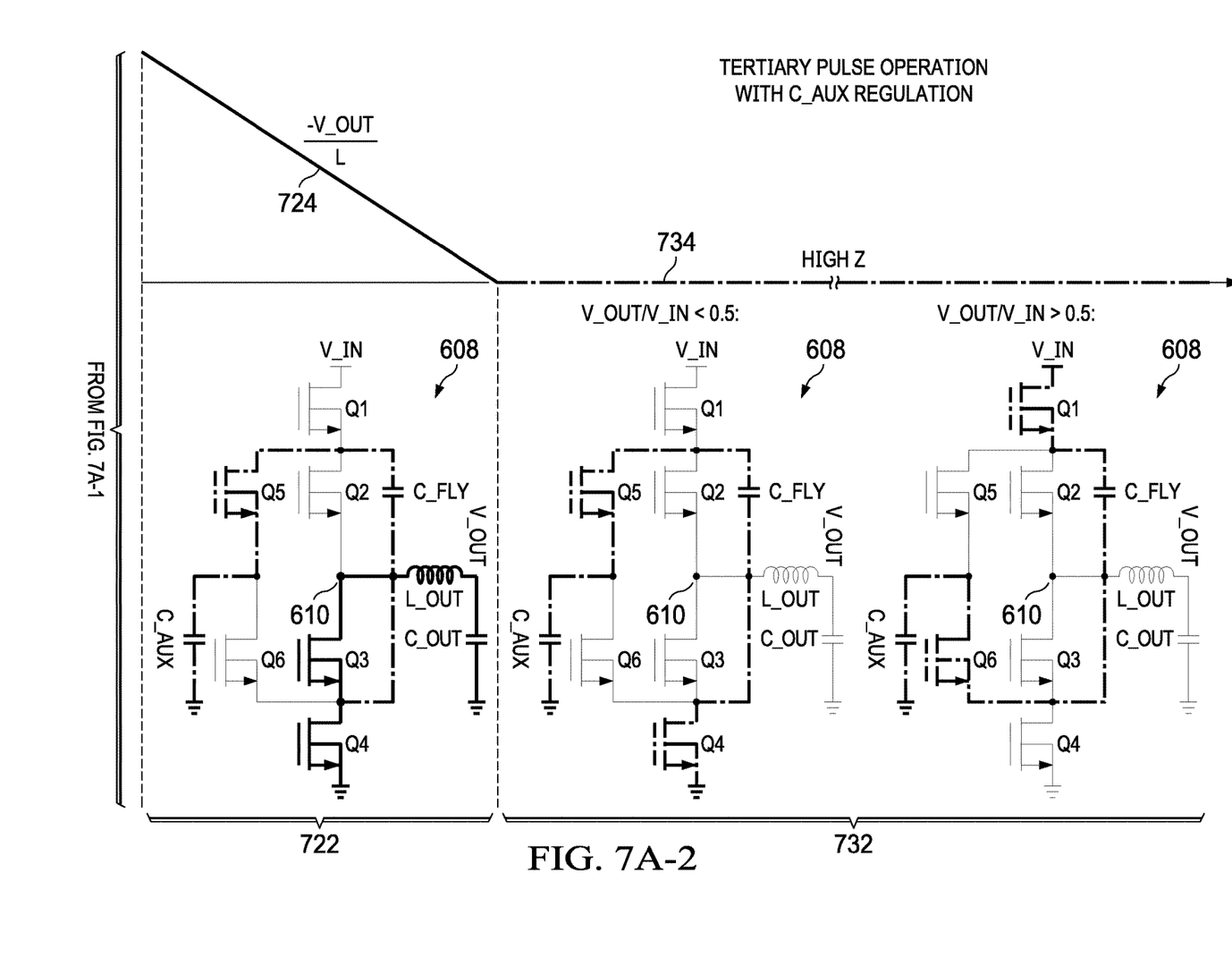
Figure 7B:
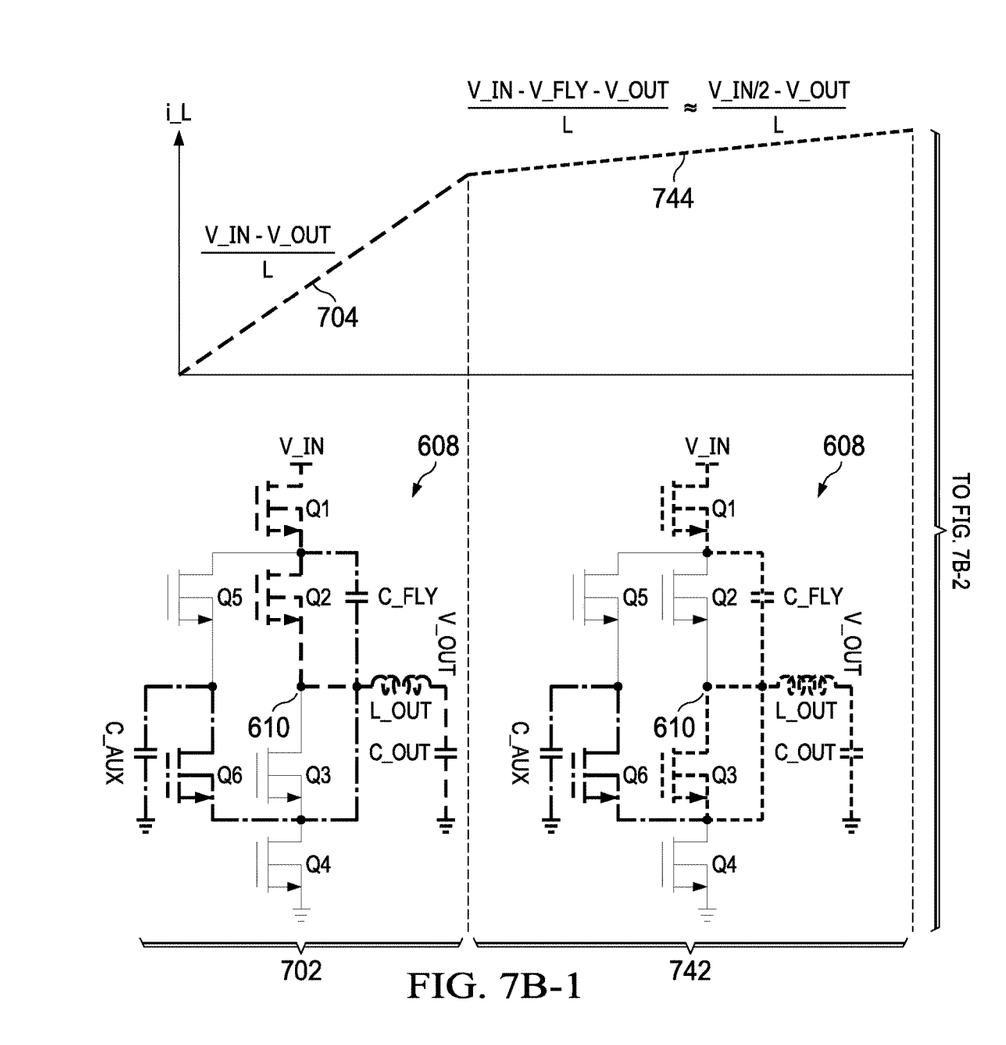
Figure 7B:
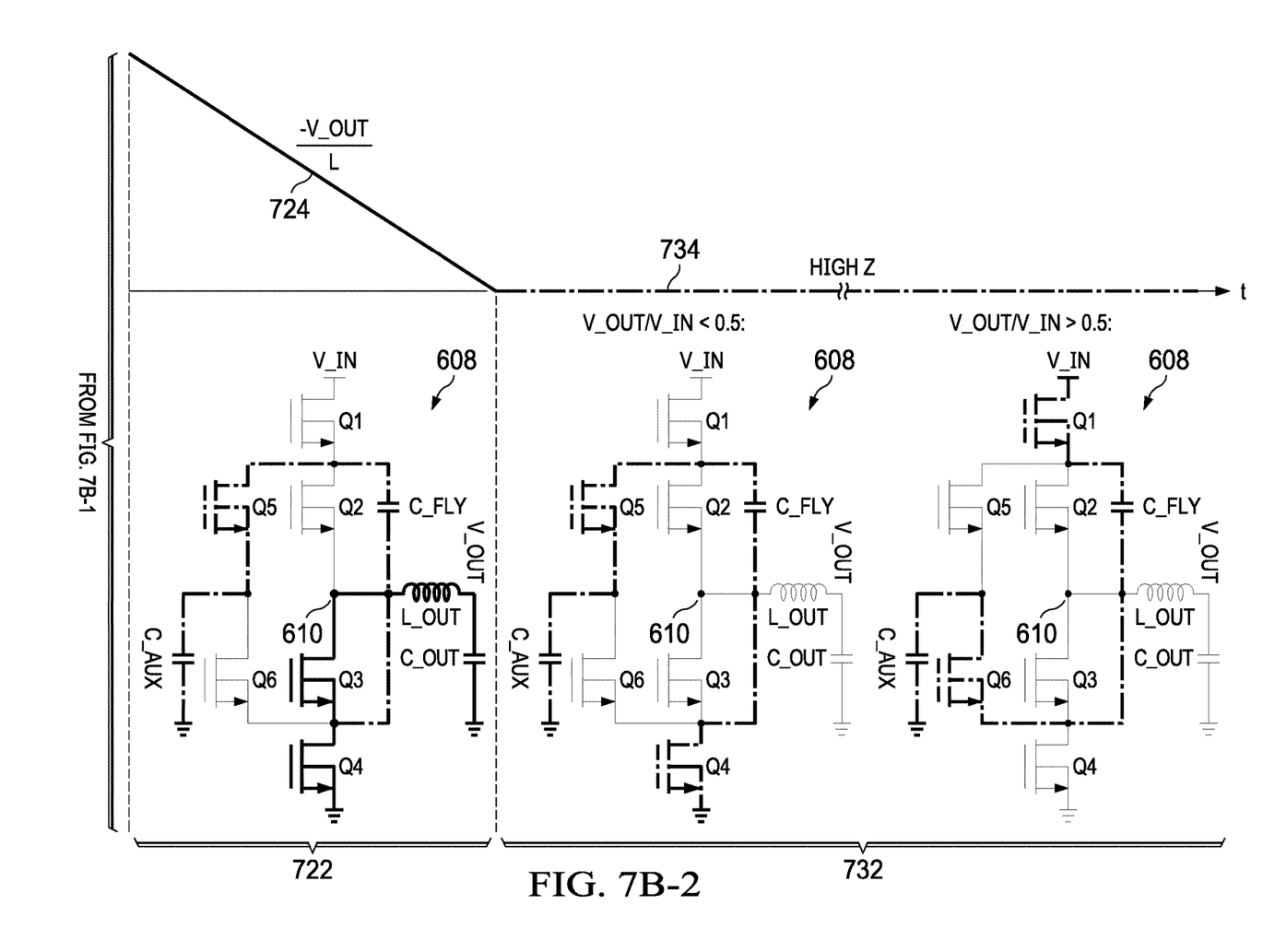

FIGS. 7A and 7B show the multi-level power converter 608 and tertiary-pulse DCM operations in accordance with various examples. In at least some examples, the tertiary-pulse DCM operations of FIGS. 7A and 7B are perform sequentially (one pulse generated as shown in FIG. 7A and the next pulse generated as shown in FIG. 7B, and so on). In FIG. 7A, the tertiary-pulse DCM operations involve switching between three voltage levels as directed by a control circuit (e.g., the control circuit 108 in FIG. 1 or the control circuit 208 in FIG. 2). More specifically, as shown in state 702, Q1, Q2, and Q6 of the multi-level power converter circuit 608 are directed to allow current flow, resulting in the output node 610 having a voltage level of V_IN−V_OUT, and resulting in increasing output inductor current values ((V_IN−V_OUT)/L_OUT)) represented by slope 704. In state 712, Q2, Q4, and Q5 are directed to allow current flow, resulting in the output node 610 having a voltage level of V_FLY−V_OUT (approximately V_IN/2−V_OUT), and resulting in increasing i_L values ((V_FLY−V_OUT)/L_OUT)) represented by slope 714. In state 722, Q3, Q4, and Q5 are directed to allow current flow, resulting in the output node 610 having a voltage level of −V_OUT, and resulting in decreasing i_L values (−V_OUT/L_OUT) represented by slope 724. In state 732, two scenarios are represented. For a scenario in which V_OUT/V_IN is less than 0.5, Q4 and Q5 are directed to allow current flow, resulting in high-impedance such that i_L values are approximately zero as represented by slope 734. For a scenario in which V_OUT/V_IN is greater than 0.5, Q1 and Q6 are directed to allow current flow, resulting in high-impedance such that i_L values are approximately zero as represented by slope 734.

In FIG. 7B, the tertiary-pulse DCM operations involve the same states as represented for the tertiary-pulse DCM operations of FIG. 7A, except that state 712 in FIG. 7A is replaced with state 742 in FIG. 7B. For state 742, Q1, Q3, and Q6 of the multi-level power converter circuit 608 are directed to allow current flow, resulting in the output node 610 having a voltage level of V_IN−V_FLY−V_OUT (approximately V_IN/2−V_OUT), and resulting in increasing output inductor current values ((V_IN−V_FLY−V_OUT)/L_OUT)) represented by slope 744.

Figure 8A:
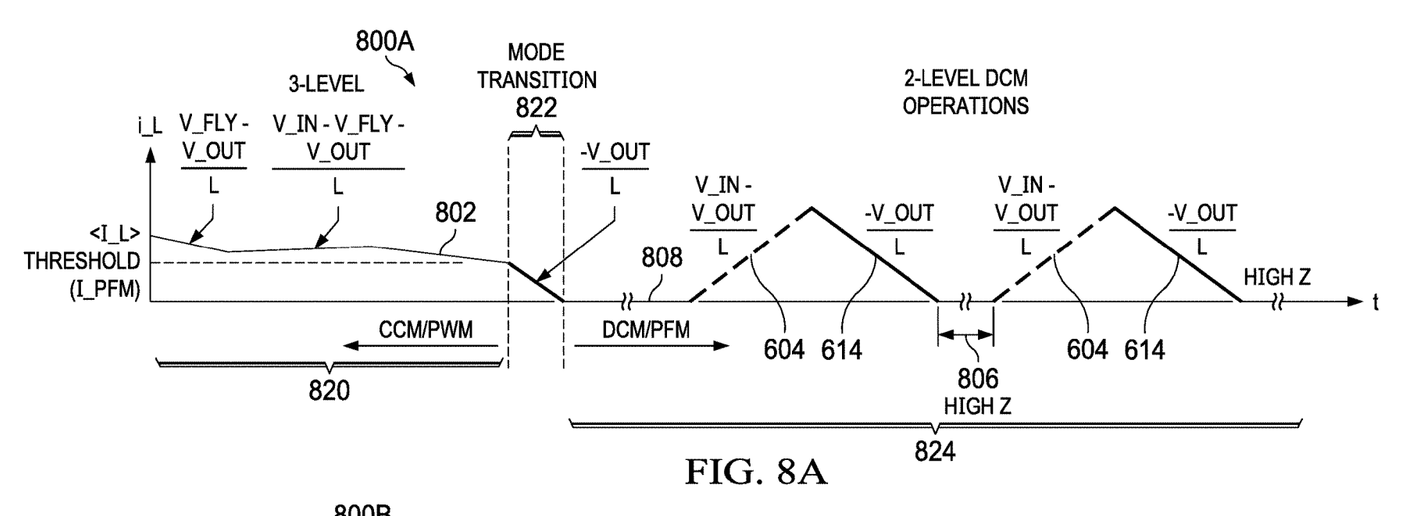
FIGS. 8A and 8B are graphs showing output current and mode information as a function of time for a power converter in accordance with various examples.
Figure 8B:
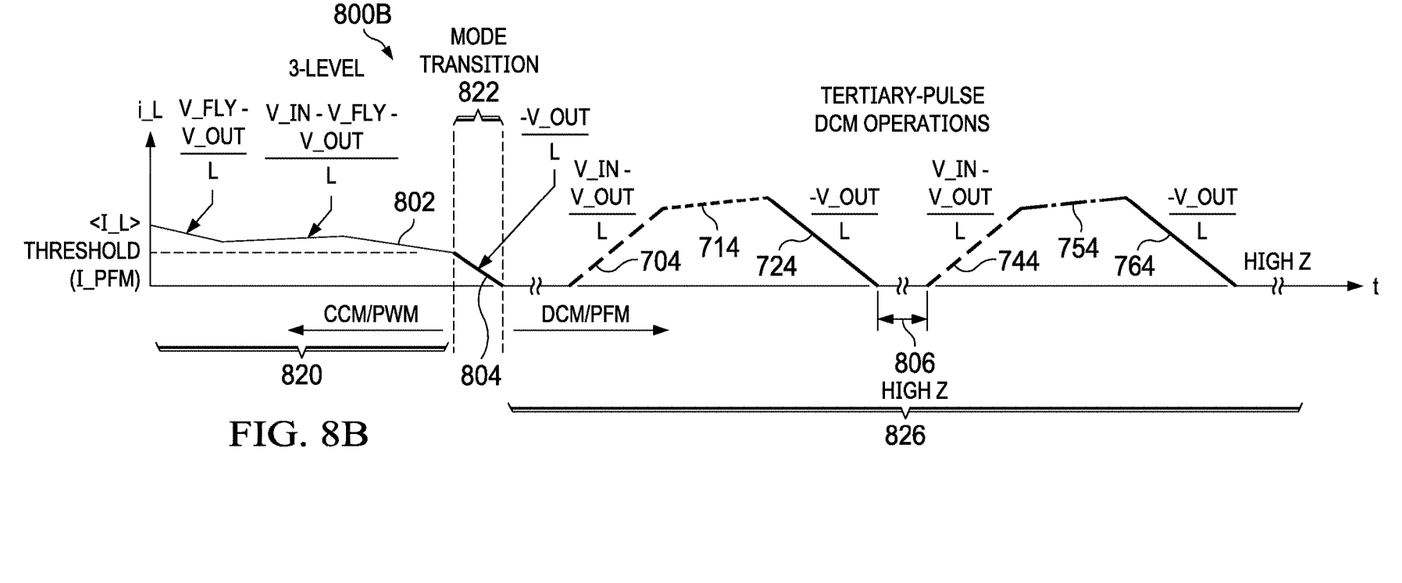

FIGS. 8A and 8B are graphs 800A and 800B showing output current and mode information as a function of time for a multi-level power converter in accordance with various examples. In graphs 800A and 800B, an output inductor current (I_L) is represented as a function of time. During interval 820 of graph 800A, multi-level power converter operations (e.g., of the multi-level power converter 102 of FIG. 1, the three-level power converter 200 of FIG. 2, the multi-level power converter 508 of FIGS. 5A and 5B, or the multi-level power converter 608 of FIGS. 6, 7A, and 7B) involve CCM operations as long as the current level 802 for I_L stays above a threshold (I_PMF). If the current level 802 drops below I_PMF or stays below I_PMF for a threshold amount of time, multi-level power converter operations a mode transition 824 occurs to perform DCM operations during interval 824.

In interval 824 of graph 800A, two-level DCM operations (see e.g., FIG. 6) are performed to generate output pulses. In some examples, the two-level DCM operations represented in interval 824 continue until a spacing 806 between adjacent output pulses is less than a spacing threshold, or is less than a spacing threshold for a threshold amount of time. In such case, multi-level power converter operations return to the CCM operations represented in interval 820. As represented in FIG. 8A, the CCM operations represented for interval 820 involve PWM, while the two-level DCM operations represented for interval 824 involve PFM.

In graph 800B of FIG. 8B, the interval 820 involving CCM operations is again represented, where the CCM operations of the interval 820 are performed as long as the current level 802 for I_L stays above I_PMF. If the current level 802 drops below I_PMF or stays below I_PMF for a threshold amount of time, multi-level power converter operations switch to DCM operations during interval 826.

In interval 826 of graph 800B, tertiary-pulse DCM operations (see e.g., FIGS. 7A and 7B) are performed to generate output pulses. In some examples, the tertiary-pulse DCM operations represented in interval 826 continue until a spacing 806 between adjacent output pulses is less than a spacing threshold, or is less than a spacing threshold for a threshold amount of time. In such case, multi-level power converter operations return to the CCM operations represented in interval 820. As represented in FIG. 8B, the CCM operations represented for interval 820 involve PWM, while the tertiary-pulse DCM operations represented for interval 826 involve PFM.

Figure 9:
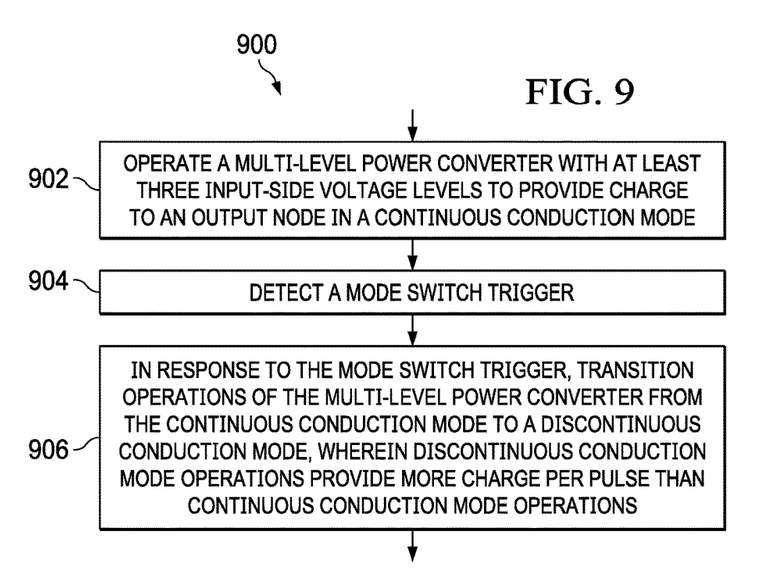
FIG. 9 shows a power conversion method in accordance with various examples.

FIG. 9 shows a power conversion method 900 in accordance with various examples. As shown, the method 900 comprises operating a multi-level power converter (e.g., the multi-level power converter 102 of FIG. 1, the three-level power converter 200 of FIG. 2, the multi-level power converter 508 of FIGS. 5A and 5B, and the multi-level power converter 608 of FIGS. 6, 7A and 7B) with at least three input-side voltage level to provide charge to an output node (e.g., output node 115 in FIG. 1, output node 214 in FIG. 2, output node 510 in FIGS. 5A and 5B, or output node 610 in FIGS. 6, 7A, and 7B) in the CCM at block 902. At block 904, a mode switch trigger is detected. In response to the mode switch trigger of block 904, operations of the multi-level power converter are transitioned from the CCM to the DCM at block 906, wherein DCM operations provide more charge per pulse than CCM operations.

In at least some examples, the mode switch trigger of block 904 comprises an output node current falling below a current threshold. As needed, the method 900 also includes transitioning from the DCM to the CCM in response to another mode switch trigger such as output pulses in the DCM having a separation that is less than a separation threshold. Also, in some examples of method 900, the DCM operations of block 906 involve providing pulses with a peak value that is at least two times larger than the current threshold. Also, in some examples of method 900, the DCM operations of block 906 involve providing output pulses based on only two input-side voltage levels. Also, in some examples of method 900, the DCM operations of block 906 involve providing output pulses based on three input-side voltage levels.

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A power converter device, comprising:
   an input terminal having an input voltage;
   an output terminal adapted to be coupled to an inductor, the output terminal having an output voltage, in which a duty ratio is a ratio between the output voltage and the input voltage;
   a set of switches coupled between the input terminal and the output terminal, the set of switches configured to generate inductor pulses by switching the output terminal between first, second and third levels of the input voltage, the third level being greater than the second level, and the second level being greater than the first level; and
   a control circuit coupled to the set of switches and configured to selectively switch the power converter device between a continuous conduction mode of operation (CCM) and a discontinuous conduction mode of operation (DCM), in which:
     in the CCM, the control circuit controls the set of switches to switch the output terminal between only the first and second levels to generate the inductor pulses at first duty ratios, or between only the second and third levels to generate the inductor pulses at second duty ratios; and
     in the DCM, irrespective of the duty ratio, the control circuit controls the set of switches to switch the output terminal between only the first and third levels to generate the inductor pulses or between all of the first, second and third levels to generate the inductor pulses.

2. The power converter device of claim 1, wherein in the DCM, irrespective of the duty ratio, the control circuit controls the set of switches to switch the output terminal between all of the first, second and third levels to generate the inductor pulses.

3. The power converter device of claim 1, wherein in the DCM, irrespective of the duty ratio, the control circuit controls the set of switches to switch the output terminal between only the first and third levels to generate the inductor pulses.

4. The power converter device of claim 3, wherein the CCM has a first charge per inductor pulse at a given duty ratio, the DCM has a second charge per inductor pulse at the given duty ratio, and the second charge per inductor pulse is greater than the first charge per inductor pulse.

5. The power converter device of claim 1, wherein the control circuit controls the set of switches using pulse width modulation in the CCM, and using pulse frequency modulation in the DCM.

6. The power converter device of claim 1, wherein the control circuitry is configured to transition from the CCM to the DCM responsive to a current at the output terminal falling below a current threshold.

7. The power converter device of claim 6, wherein; in the DCM, the inductor pulses have a peak value that is at least two times larger than the current threshold.

8. The power converter device of claim 1, wherein the control circuitry is configured to transition from the DCM to the CCM responsive to the inductor pulses having a separation that is less than a separation threshold.

9. The power converter device of claim 1, wherein the set of switches and the control circuitry are components of an integrated circuit.

10. A power converter device, comprising:
    an input terminal having an input voltage;
    an output terminal adapted to be coupled to an inductor, the output terminal having an output voltage, in which a duty ratio is a ratio between the output voltage and the input voltage;
    a set of transistors coupled between the input terminal and the output terminal, the set of transistors configured to generate inductor pulses by switching the output terminal between first, second and third levels of the input voltage; and
    a controller coupled to the set of transistors and configured to selectively control the set of transistors in a continuous conduction mode (CCM) and a discontinuous conduction mode (DCM), in which the CCM has a first charge per inductor pulse at a given duty ratio, the DCM has a second charge per inductor pulse at the given duty ratio, and the second charge per inductor pulse is greater than the first charge per inductor pulse.

11. The power converter device of claim 10, wherein:
the power converter device further comprises a ground terminal;
the set of transistors includes a first transistor, a second transistor, a third transistor and a fourth transistor, each having a respective first current terminal and a respective second current terminal,
the first current terminal of the first transistor is coupled to the input terminal,
the second current terminal of the first transistor is coupled to the first current terminal of the second transistor,
the second current terminal of the second transistor is coupled to the first current terminal of the third transistor,
the second current terminal of the third transistor is coupled to the first current terminal of the fourth transistor, and
the second current terminal of the fourth transistor is coupled to the ground terminal.

12. The power converter device of claim 11, wherein:
the set of transistors includes a fifth transistor and a sixth transistor, each having a respective first current terminal and a respective second current terminal,
the first current terminal of the fifth transistor is coupled to the second current terminal of the first transistor,
the second current terminal of the fifth transistor is coupled to the first current terminal of the sixth transistor,
the second current terminal of the sixth transistor is coupled to the second current terminal of the third transistor, and
the power converter device further comprises an auxiliary capacitor terminal coupled to the second current terminal of the fifth transistor.

13. The power converter device of claim 12, further comprising:
a first flying capacitor terminal coupled to the second current terminal of the first transistor, and
a second flying capacitor terminal coupled to the second current terminal of the third transistor, in which the output terminal is coupled to the second current terminal of the second transistor.

14. The power converter device of claim 13, wherein in the DCM, the controller is configured to:
selectively control the set of transistors to generate an increasing amount of charge at the output terminal by the first, second and sixth transistors together, and to subsequently generate a decreasing amount of charge at the output terminal by the third, fourth and sixth transistors together.

15. The power converter device of claim 13, wherein in the DCM, the controller is configured to:
selectively control the set of transistors to generate an increasing amount of charge at the output terminal by the first, second and sixth transistors together, and to subsequently maintain an amount of charge at the output terminal above a threshold by the second, fourth and fifth transistors together, and to subsequently generate a decreasing amount of charge at the output terminal by the third, fourth and fifth transistors together.

16. The power converter device of claim 13, wherein; in the DCM, the controller is configured to:
selectively control the set of transistors to generate an increasing amount of charge at the output terminal by the first, second and sixth transistors together, and to subsequently maintain an amount of charge at the output terminal above a threshold by the first, third and sixth transistors together, and to subsequently generate a decreasing amount of charge at the output terminal by the third, fourth and fifth transistors together.

17. The power converter device of claim 10, wherein the controller is configured to transition: from the CCM to the DCM responsive to a current at the output terminal falling below a current threshold; and from the DCM to the CCM responsive to the inductor pulses having a separation that is less than a separation threshold.

18. The power converter device of claim 17, wherein in the DCM, the inductor pulses have a peak value that is at least two times larger than the current threshold.

* * * * *